US 9,295,105 B2

(12) United States Patent
Bejerano et al.

(10) Patent No.: US 9,295,105 B2
(45) Date of Patent: Mar. 22, 2016

(54) METHODS AND DEVICES FOR CONFIGURING SIMPLIFIED, STATIC, MULTI-HOP WIRELESS NETWORKS

(75) Inventors: Yigal Bejerano, Springfield, NJ (US); Amit Kumar, New Delhi (IN)

(73) Assignee: Alcatel Lucent, Boulogne-Billancourt (FR)

( * ) Notice: Subject to any disclaimer, the term of this patent is extended or adjusted under 35 U.S.C. 154(b) by 2266 days.

(21) Appl. No.: 10/879,062

(22) Filed: Jun. 30, 2004

(65) Prior Publication Data
US 2006/0002302 A1    Jan. 5, 2006

(51) Int. Cl.
*H04L 12/26* (2006.01)
*H04W 92/02* (2009.01)
*H04L 12/751* (2013.01)
*H04L 12/717* (2013.01)

(52) U.S. Cl.
CPC ............... *H04W 92/02* (2013.01); *H04L 45/02* (2013.01); *H04L 45/42* (2013.01)

(58) Field of Classification Search
USPC ......................................... 370/252, 347, 351
See application file for complete search history.

(56) References Cited

U.S. PATENT DOCUMENTS

| | | | |
|---|---|---|---|
| 2003/0063585 A1* | 4/2003 | Younis et al. | 370/331 |
| 2004/0010492 A1* | 1/2004 | Zhao et al. | 707/3 |
| 2004/0233855 A1* | 11/2004 | Gutierrez et al. | 370/252 |
| 2005/0248652 A1* | 11/2005 | Firestone et al. | 348/14.09 |
| 2005/0256886 A1* | 11/2005 | Armanino et al. | 707/100 |
| 2008/0298275 A1* | 12/2008 | De Sousa | 370/255 |

* cited by examiner

*Primary Examiner* — Wanda Z Russell
(74) *Attorney, Agent, or Firm* — Capitol Patent & Trademark Law Firm, PLLC

(57) ABSTRACT

Wireless stations (and their associated operation) making up a static, multi-hop wireless network are simplified because topological modeling and routing/scheduling decisions are shifted from the stations to a controller external to the network. The controller may determine routing paths and schedules for each of the wireless stations in a network based on the topology of a given network along with other network characteristics. Thereafter, the so-determined paths and schedules are sent to the associated wireless stations. By simplifying the operation of a wireless station, the amount of energy required to be used by each station may be reduced thereby maximizing the lifetime of the network.

12 Claims, 2 Drawing Sheets

METHODS AND DEVICES FOR CONFIGURING SIMPLIFIED, STATIC, MULTI-HOP WIRELESS NETWORKS

BACKGROUND OF THE INVENTION

Static, multi-hop wireless networks, such as disaster recovery networks, community-based networks and large wireless infrastructure networks are composed of many wireless stations. FIG. 1 depicts a simplified layout of a static, multi-hop wireless network 1. As shown, network 1 is made up of a number of wireless stations 2a, ..., 2n, 3a, ..., 3n, and 23a, 23b. As depicted in FIG. 1, in order for a wireless station 3a (and therefore a user of a wireless station 3a) to communicate with a backbone network 5, messages from wireless station 3a must be sent through intermediate wireless stations 3b, 3c, 23a, 3d, and 2a before being received by a user 6a within the backbone network 5. Similarly, in order for a user of wireless station 3e to communicate with a user 6b within backbone network 5, a message must be sent through intermediate wireless stations 3f, 3g, 23b, 3h and 2e. This required use of intermediate wireless stations or "hops" to send (and receive) messages is what characterizes a multi-hop, wireless network.

As further depicted in FIG. 1, wireless stations 23a and 23b are known as "bottleneck" nodes because messages from many of the other wireless stations must be routed through them to the backbone network 5. In order to so route these messages, wireless stations 23a, 23b must utilize complex techniques to model the actual topology of network 1 to ensure, for example, that messages sent from each wireless station are appropriately routed to the backbone network 5. In fact, in conventional, multi-hop wireless networks, each of the wireless stations 2a, ..., 2n, 3a, ..., 3n, and 23a, 23b utilize complex techniques to model the actual topology of network 1 to ensure proper transmission and reception of messages to and from the backbone network 5. These complex techniques necessarily result in the need for complex and costly wireless stations.

It is, therefore, desirable to reduce the cost of wireless stations while maintaining or increasing the efficiency at which a wireless station transmits messages to, and receives messages from, a backbone network.

In most cases, each of the wireless stations in FIG. 1 obtains its energy/power (collectively referred to as "energy") from a source which has a limited supply of energy, e.g., batteries. Once the energy is used up, the station can no longer be used until its batteries are recharged or power is supplied from another source. The less energy a station uses, the longer it can go without having its batteries recharged or replaced. It is, therefore, also desirable to provide wireless stations that use less energy.

SUMMARY OF THE INVENTION

We have recognized that a new type of static, multi-hop wireless network, which can be referred to as a configurable access wireless network ("CAN"), allows for the design and use of simplified wireless stations. CANs make advantageous use of two observations to provide simplified wireless stations. The first observation is that some wireless stations act as "access points" ("APs") to directly connect a multi-hop wireless network to a wired or wireless infrastructure of a backbone network. The second observation is that, most of the time, the other non-AP stations within the network communicate with stations external to the wireless network, i.e., with devices within a backbone network, by traversing one or more APs. In accordance with the present invention, to provide simplified wireless stations in a multi-hop wireless network, topological modeling and routing/scheduling decisions which are typically carried out by each wireless station are instead carried out by a controller.

Shifting the responsibility of modeling the topology of a network and decisions involving routing/scheduling from each wireless station to a controller relieves each wireless station of these responsibilities which, in turn, allows each wireless station's operation and design to be simplified. These simplified wireless stations also require less energy to operate.

DETAILED DESCRIPTION OF THE INVENTION

Figure 1:
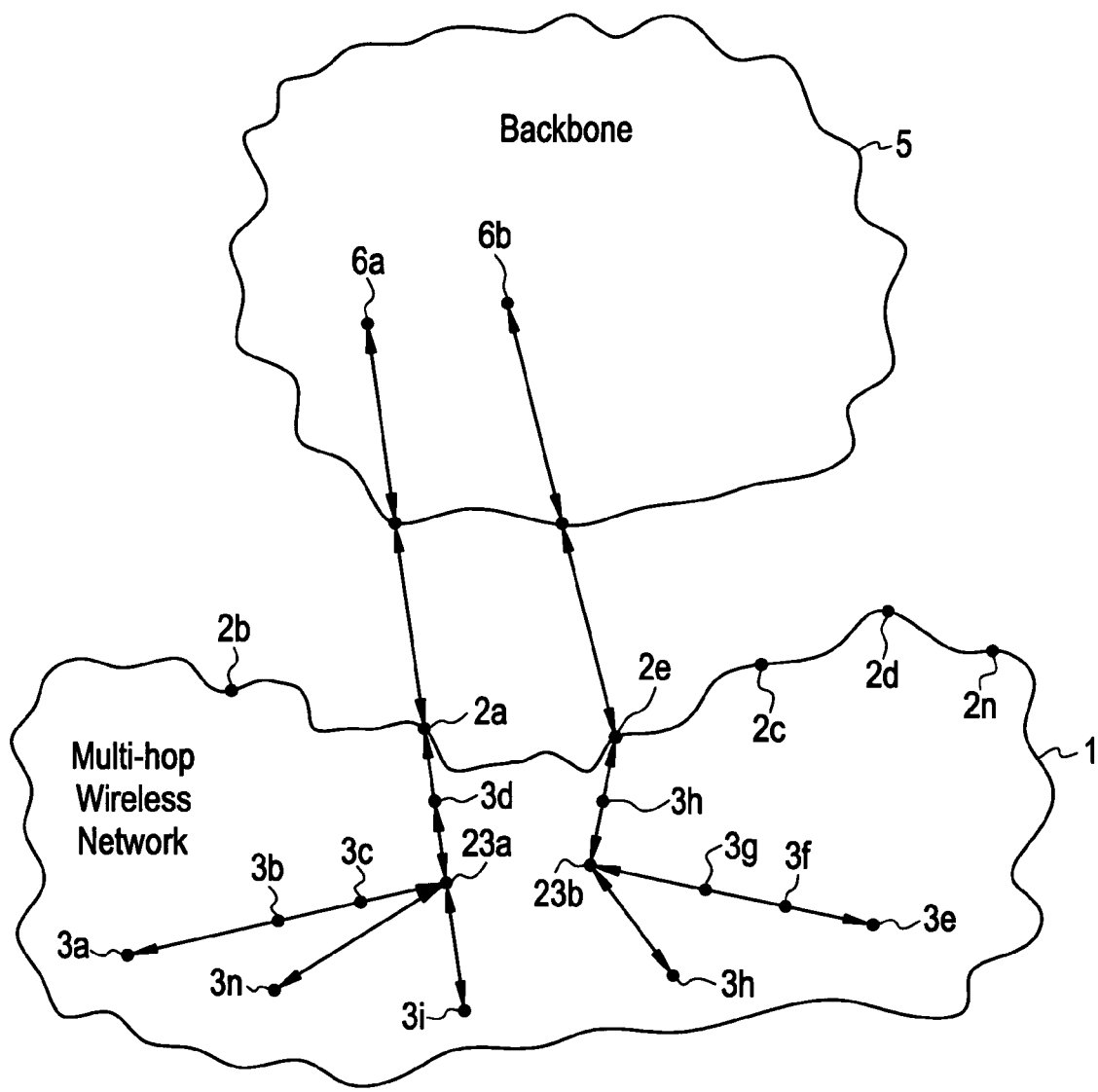
FIG. 1 depicts a simplified diagram of a conventional, static multi-hop wireless network.
Figure 2:
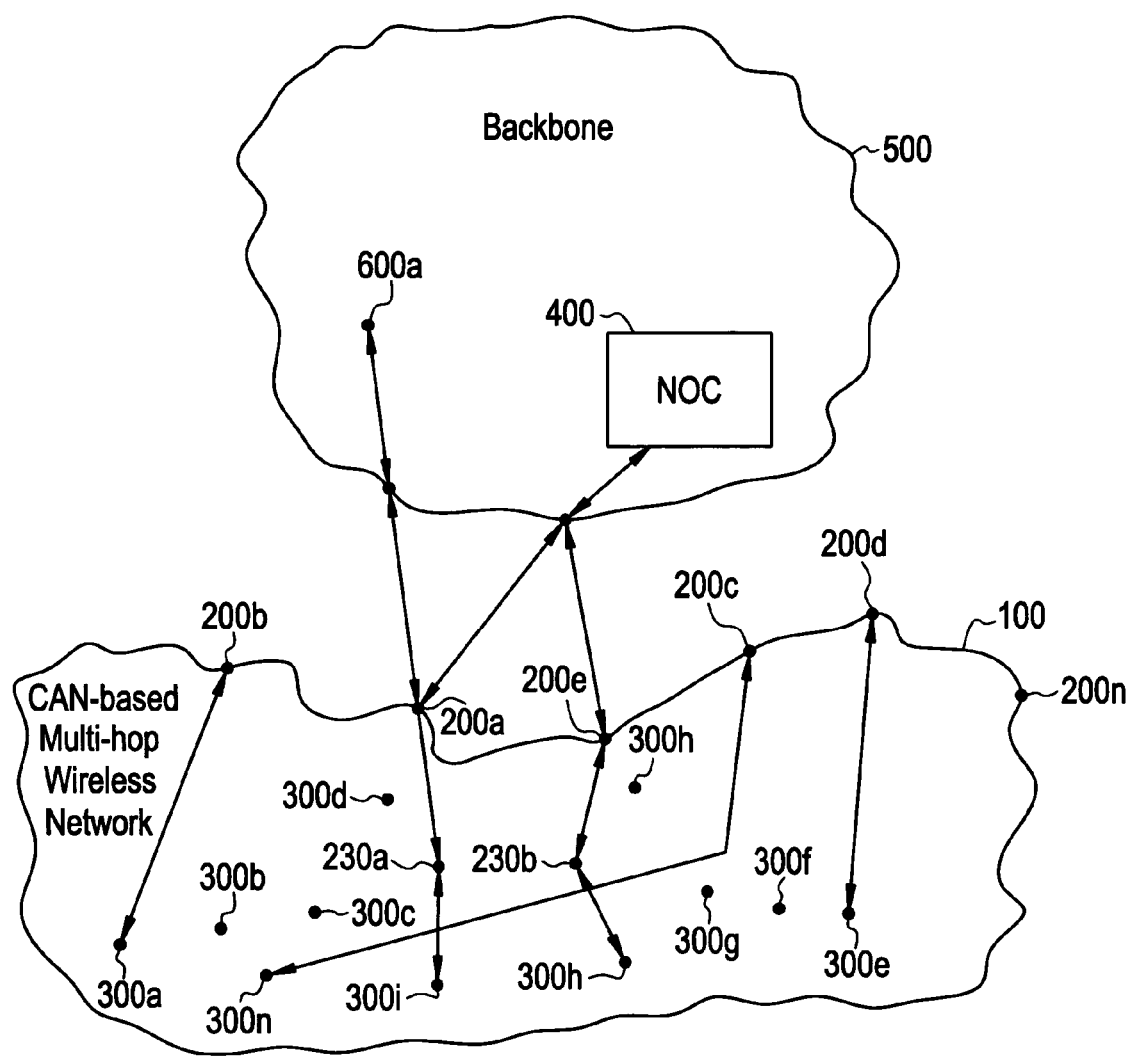
FIG. 2 depicts a diagram of a simplified, static multi-hop wireless network according to an embodiment of the present invention.

Referring now to FIG. 2, there is shown an illustration of a simplified, static, multi-hop wireless network or CAN 100 according to one embodiment of the present invention. As shown, a network 100 includes one or more AP stations 200a, 200b, ... 200n ("APs" for short), and non-AP stations ("stations") 300a, 300b, ... 300n (where "n" is a last AP or station). Unlike the stations shown in FIG. 1, the stations shown in FIG. 2 are not responsible for generating topological models or routing/scheduling decisions. Instead, a network operation center or controller ("NOC") 400 may be operable to generate topological models of the network 100, to generate routing tables (sometimes referred to as forwarding tables) and to generate packet transmission schedules for each wireless station within network 100. After determining (the words "determining" and "generating" will be interchangeable and synonymously used herein) the topological models, routes and schedules, NOC 400 is thereafter further operable to configure each wireless station 300a, 300b, ... 300n, 230a, 230b, and APs 200a, 200b, ... 200n with its respective, so-determined routes and schedules such that each station's operation is simplified.

Simplified wireless stations and APs may provide a number of benefits. For example, simplified stations may require less energy to operate. This is important in a multi-hop wireless network because if a wireless station, say wireless station 230a in FIG. 2, loses energy, then messages cannot be sent from wireless station 300i to the backbone network 500 because wireless station 230a is used by station 300i to relay messages to the backbone network 500. It is important, therefore, to make efficient use of the limited energy typically available to a station.

Simplifying the operation of wireless stations may also affect load balancing and security aspects associated with each wireless station. Energy requirements, load balancing and security issues may be collectively referred to as "criteria". It can be said that simplifying the operation of wireless stations helps optimize one or more criteria associated with each of the wireless stations and an overall network to which the stations belong.

Another benefit which results from placing the responsibility of generating routing paths and schedules in an NOC is that so-called "overhead" generated by each wireless station is reduced. That is, because each wireless station is no longer responsible for generating any number of possible routing paths and schedules, the computational load on each station is substantially reduced.

As mentioned above, one of the benefits that follows from simplified wireless stations is that the energy required by each wireless station may be reduced. Accordingly, in an additional embodiment of the present invention, after a NOC 400 determines the topology of network 100, it may be further operable to determine routing paths which maximize a minimum energy-to-traffic ratio associated with network 100.

In more detail, there is an energy-to-traffic ratio associated with each of the wireless stations within network 100. In accordance with one embodiment of the present invention, the NOC 400 is operable to first determine a minimum energy-to-traffic ratio and then maximize this ratio. By so doing, the NOC 400 assures that an optimal amount of energy is used (i.e., the energy used by each of the wireless stations within network 100 is used most efficiently). This in turn helps extend or maximize the lifetime of the network 100 by postponing the time at which one or more of the wireless stations will fail because its battery has reached an insufficient energy level.

There may be one or more routing techniques which the NOC 400 may use to maximize this minimum energy-to-traffic ratio. Some of these techniques are disclosed in co-pending U.S. patent application Ser. No. 10/879,064, the disclosure of which is incorporated herein as if set forth in full herein.

In an additional embodiment of the present invention, after the NOC 400 determines the topology of the network 100, it may be further operable to determine schedules for the transmission of packets (i.e., messages) from each of the wireless stations within network 100 in such a way that energy is conserved. Similar to the routing discussion above, there may be a number of ways to schedule packet transmissions in order to reduce or conserve the energy stored within each of the wireless stations in network 100. Some of these techniques are disclosed in co-pending U.S. patent application Ser. No. 10/879,063, the disclosure of which is incorporated herein as if set forth in full herein. In general, the techniques set forth in co-pending U.S. patent application Ser. No. 10/879,063 involve the control of wireless stations to prevent transmitted packets from colliding. Collisions require the re-transmission of the collided packets. Avoiding collisions and subsequent re-transmission of packets conserves energy and permits the generation of schedules that allows each station to remain in a so-called "sleep mode" for an extended period of time. While in a sleep mode, a station uses substantially less energy than when it is in a more active mode.

More particularly, the NOC 400 is operable to determine schedules for wireless stations within network 100 only when the network 100 comprises a Time Division Multiple Access (TDMA)-like network.

As mentioned before, before the NOC 400 can determine routing paths and schedules for each wireless station within network 100, it must first determine the topology of the network 100. In a further embodiment of the present invention, the NOC 400 is operable to generate a model representative of the topology of the network 100.

For example, in one embodiment of the present invention, network 100 may comprise a wireless surveillance network, the topology of which can be modeled by a graph G(V, E) having a set of APs, A, where U represents all non-AP stations, $d_v$ and $b_v$ represent the bandwidth requirements and initial energy level of every station v, where v∈U, respectively. Upon receiving an activation message from NOC 400, each station within network 100 is operable to listen to a default control channel and periodically send HELLO-like messages to advertise its identity. After activating all of the stations, the NOC 400 is operable to query all of the stations to determine each station's bandwidth requirements, present energy level (e.g., battery level) and neighboring stations ("neighbors").

Information about a station's neighbors enables the NOC 400 to infer the topology of the network 100 containing the queried stations. If it is assumed that the NOC 400 only knows the identity of APs 200a, 200b, . . . 200n in network 100 prior to querying the stations, the NOC 400 may obtain the identities of all stations that are one hop away from an AP by so querying the APs. Similarly, by querying all of the neighbors of each AP, the NOC 400 is operable to discover the stations that are two hops away from the APs. This process continues until the NOC 400 has discovered the entire topology of network 100, layer-by-layer. This type of layer-by-layer discovery of a network's topology may be referred to as a "breadth first search." After generating a topology of network 100, the NOC 400 may then be operable to determine routing paths for each station based on this topological information and other station characteristics (e.g., bandwidth requirements, energy levels).

In a CAN, there is no built-in routing mechanism. Because of this, a message cannot be sent from, or to, a wireless station by simply specifying its address. In a further embodiment of the present invention, this problem is overcome by using a source-routing approach where each message carries its complete path, e.g., the address of each station between the source of the message and the message's destination, to its destination. Any reply is returned on a reverse path.

For example, the NOC 400 of the surveillance wireless network 100 may be operable to select a single path $P_v$ for each station v∈U. The path $P_v = \{u_0 = v, u_1, u_2, \ldots, u_k = a \in A\}$, termed the virtual connection ("VC") of station v, is used as the primary path for carrying traffic to and from station v to an AP.

As mentioned above, simplified wireless stations may be used to optimize energy requirements, load balancing requirements and/or security requirements. The determination of primary paths for each station may be affected by the criteria chosen to be optimized. For example, if the criteria sought to be optimized is related to the efficient use of energy, then the NOC 400 may be operable to determine paths for each of the wireless stations which maximize a minimum, energy-to-traffic ratio. As indicated before, some techniques for doing so are disclosed in co-pending U.S. patent application Ser. No. 10/879,064 referred to above.

After determining the topology of a wireless network, and generating paths and schedules for each station, the NOC 400 is operable to configure, or re-configure as the case may be (collectively, configure and/or re-configure will be referred to as, "configure"), the stations so that they may make use of the so generated paths and schedules. This may be done on a station-by-station basis or en masse, i.e, after all the primary paths are determined/all re-transmissions scheduled. First, the NOC 400 is operable to calculate one or more new packet forwarding tables for each station, v, where again v∈V. Each table contains a record for every primary path, previously determined by NOC 400, that traverses through a given station v and the relevant information for forwarding packets along such paths. This information may comprise the primary path label, the address of the successor station and the slot numbers of the incoming and outgoing packets.

The NOC 400 is then operable to configure each station by sending the new tables to each station using one or more dedicated configuration messages. Upon reception of a new table, each station is operable to update its own stored, corresponding forwarding table with the new tables.

The NOC 400 may then be further operable to send the packet transmission schedules associated with each station to each respective station. Thereafter, the NOC 400 may send one or more messages to initiate packet transmissions (i.e., trigger each station to access its forwarding tables and transmission schedules).

The above discussion has sought to set forth some examples of how static, multi-hop wireless networks may be simplified. Having set forth some examples of the present invention, it should be understood that others may be envisioned that may fall within the scope of the present invention which is better defined by the claims which follow.

We claim:

1. A system comprising:
    a network controller residing in a backbone communication network, the backbone-based network controller operable to,
    communicate with a static, multi-hop wireless network comprising a set of access point (AP) wireless stations in direct communication with the backbone communication network and a plurality of non-AP wireless stations,
    query the AP wireless stations and neighboring nodes to determine a topology of the static wireless network,
    determining a primary path for each non-AP wireless station based on criteria chosen to optimize an aspect of the static wireless network, the determined primary path indicating the path for exchanging traffic between a respective non-AP wireless station and a selected AP wireless station thereby facilitating communications between each non-AP wireless station and the backbone network, and
    configure each non-AP wireless station by sending packet forward table information comprising the determined primary path for each non-AP wireless station to such a station.

2. The system of claim 1, wherein the backbone network-based controller is further operable to determine packet transmission schedules for the non-AP wireless stations to minimize packet collisions and allowing one or more of the plurality of non-AP wireless stations to remain in a sleep mode for an extended time.

3. The system as in claim 1 wherein the criteria comprises maximizing a minimum energy-to-traffic ratio.

4. The system as in claim 1 wherein the backbone network comprises a wired network.

5. The system as in claim 1 wherein the backbone network comprises a wireless network.

6. The system as in claim 2 wherein the static wireless network comprises a Time Division, Multiple Access (TDMA) network.

7. The system as in claim 1 wherein the criteria are selected from the group consisting of a non-AP wireless station energy requirement, a load balancing requirement among the plurality of non-AP wireless stations, and security requirements of the static wireless network.

8. A method for configuring a static, multi-hop wireless network utilizing a network controller located in a separate, backbone communication network, the static, multi-hop wireless network including a set of access point (AP) wireless stations in direct communication with the backbone communication network and a plurality of non-AP wireless stations, the method comprising:
    querying the AP wireless stations and neighboring nodes to determine a topology of the static wireless network using the network controller;
    determining a primary routing path between each one of the non-AP wireless stations and a selected one of the AP wireless stations based at least on criteria chosen to optimize an aspect of the static wireless network selected from the group consisting of a non-AP wireless station energy requirement, a load balancing requirement among the plurality of non-AP wireless stations, and security requirements of the static wireless network; and
    sending packet forwarding table information, associated with each determined primary routing path to an associated non-AP wireless station.

9. The method as in claim 8 further comprising determining packet transmissions schedules for the non-AP wireless stations to minimize packet collisions to allow one or more non-AP wireless stations to remain in a sleep mode for an extended time.

10. The method as in claim 8 wherein the backbone network comprises a wired network.

11. The method as in claim 8 wherein the backbone network comprises a wireless network.

12. The method as in claim 9 wherein the static wireless network comprises a Time Division, Multiple Access (TDMA) network.

* * * * *